United States Patent Office 3,396,885
Patented Aug. 13, 1968

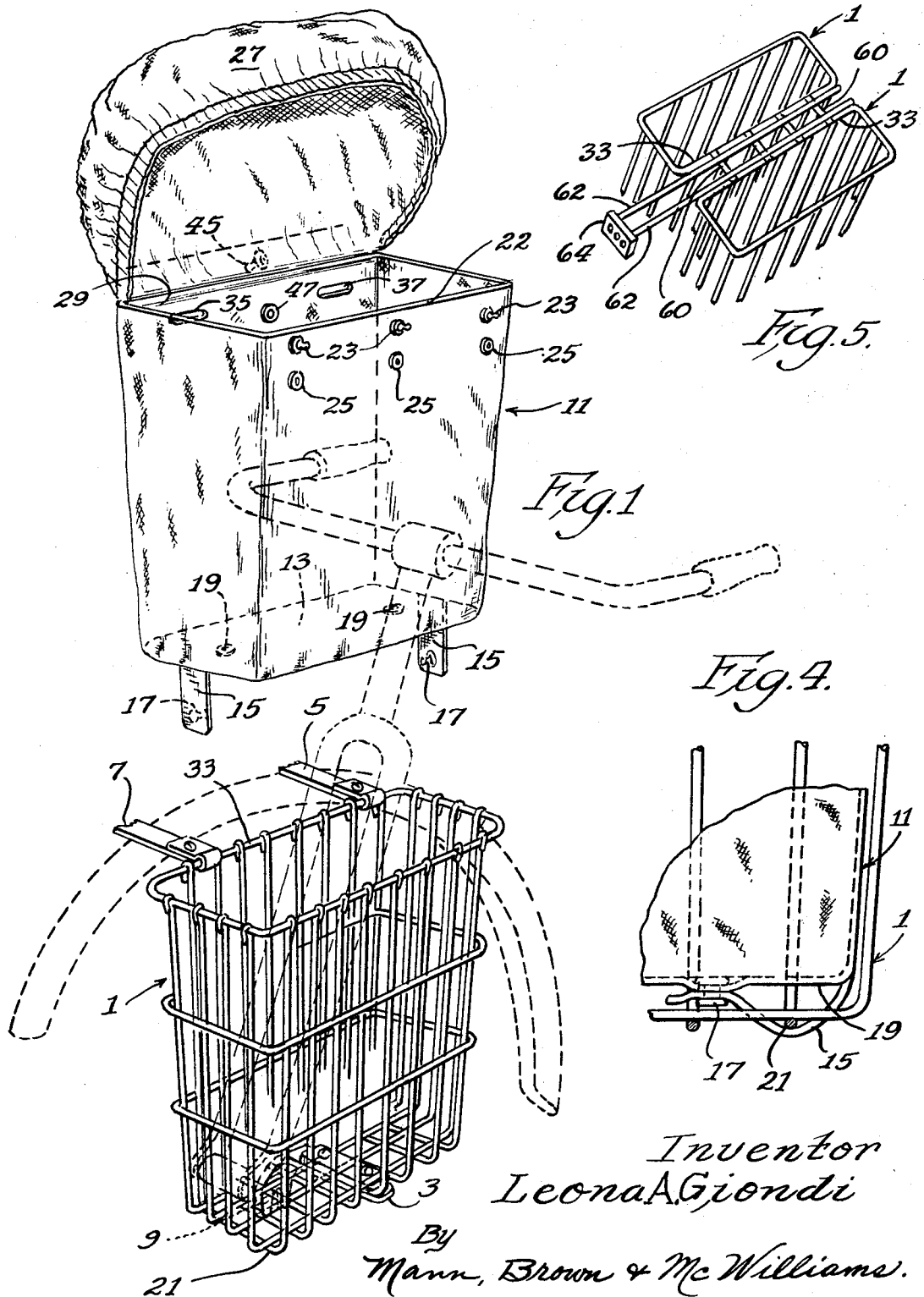

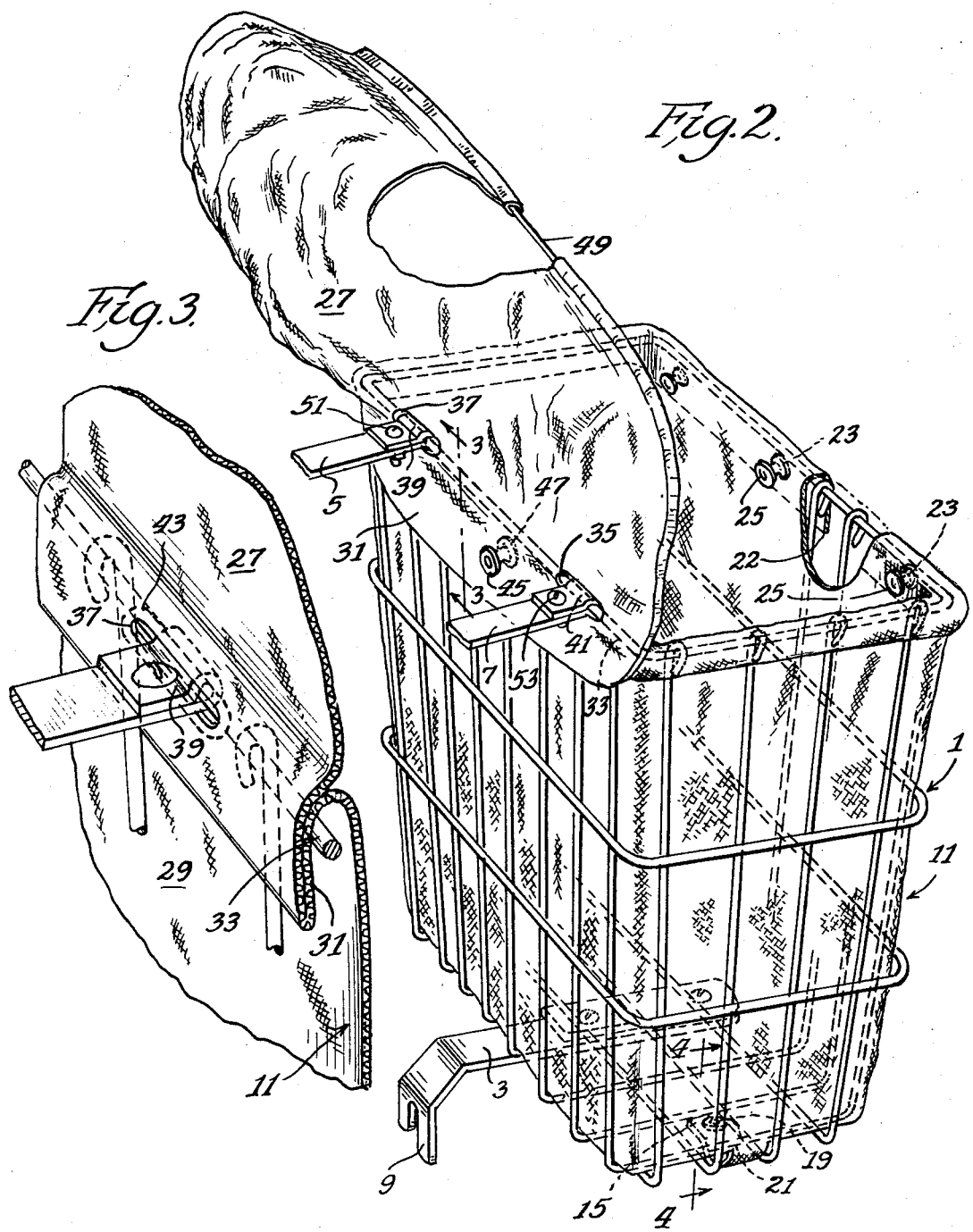

3,396,885
BICYCLE WIRE BASKET LINER AND COVER
Leona Ann Giondi, P.O. Box 304,
Warrenville, Ill. 60555
Continuation-in-part of application Ser. No. 522,117,
Jan. 21, 1966. This application Feb. 16, 1967, Ser.
No. 616,716
10 Claims. (Cl. 224—32)

ABSTRACT OF THE DISCLOSURE

A liner and cover for bicycle wire baskets made of plastic or other pliable waterproof material, shaped to fit snugly inside the basket and provided with means for removably fastening the liner to the bottom and top of the basket.

Cross references to related applications

This application is a continuation-in-part of application Ser. No. 522,117, filed Jan. 21, 1966, now Patent No. 3,322,313, and the disclosure of the last-identified application is incorporated herein by reference.

Background of the invention

Wire baskets mounted on bicycles expose the contents so that during inclement weather, or when the streets are wet or muddy, the contents become wet and/or splashed with dirt and mud.

To the best of my knowledge there was not available, prior to my invention, any means for protecting the contents of such baskets against the weather other than placing the contents in a waterproof bag or envelope prior to placing them in the basket.

It has been previously proposed to provide plastic covers for wire shopping baskets. See Patent No. 2,917,094. Such covers are placed on the outside of the basket and do not provide protection on the bottom against splashing. Outside covers are not practicable for certain types of bicycle baskets, particularly those which are mounted on the sides of the frame or wheels, for the reason that they are repeatedly subjected to scuffing and tearing when the bicycle is laid on its side, upsets or rubs against a hard surface.

My invention is designed to provide a protective covering which snugly fits the bicycle wire basket and protects the contents thereof on all sides. With certain types of baskets such as shallow baskets mounted on the front of the handle bars, I prefer to provide a waterproof, flexible outside cover or sheath which fastens at its bottom to a rigid waterproof member which fits on the inside bottom of the basket so that the sheath and bottom cooperate to hold each other in place and provide complete protection to the contents of the basket. This form of the invention is described and claimed in copending application Ser. No. 522,117, now Patent No. 3,322,313.

Where the baskets are mounted on the side of the wheels or frame, I prefer to place inside the basket a flexible or pliable liner shaped to conform to the inside of the basket and to fit snugly against the inside walls thereof. The liner is equipped with elements to hold the bottom snugly against the inside bottom of the basket and the top of the liner is formed in such manner as to cause it to remain snugly against the top rim of the basket. As a result the liner remains in place when objects are inserted in or removed from the basket, even when such objects have become wedged therein. In addition, the liner is preferably but not necessarily formed integrally with a top flap or cover which is adapted to close the top of the basket and fasten to the side walls of the liner.

Brief description of the drawings

FIGURE 1 is an exploded perspective view of the front end of a bicycle showing the manner in which the liner and cover are mounted in and on a wire basket.

FIGURE 2 is a perspective view of a bicycle wire basket with the liner in place in the basket and the cover open.

FIGURE 3 is a perspective view of a portion of the liner and cover showing the manner in which the cover is formed and the manner in which the top and the liner accommodate the bars supporting the basket.

FIGURE 4 is a fragmentary vertical sectional view taken along line 4—4 of FIGURE 2 showing the manner in which the liner is fastened to the bottom of the basket.

FIGURE 5 is a fragmentary perspective view of a form of dual basket arrangement for mounting over the rear wheel of a bicycle.

Description of preferred embodiment

Referring to the drawings, particularly FIGURES 1 and 3, the numeral 1 indicates a wire carrying basket mounted on the side of the front wheel by means of brackets 3, 5 and 7. Bracket 3 is mounted on the front wheel axle by means of the bifurcated end 9 and held in place by the nut which holds the wheel in the front fork of the bicycle. The bars or brackets 3 and 7 may additionally be provided to support the basket. Ordinarily there will be matching baskets on each side of the wheel.

Liner 11 is made of flexible or pliable plastic material or of cloth or other fibrous material coated or impregnated with rubber or plastic material to make it waterproof. Such materials are generally available. The liner is shaped to fit inside the basket 1 and be supported against the sides and bottom thereof. Where coated or impregnated cloth, felt or other fibrous material, it may be cut from a roll of cloth and sewn together at the edges into the desired shape. Where the liner is made of plastic material such as polyethylene or polypropylene it may be molded into the desired shape or where the plastic is thermoplastic it may be formed into the desired shape by heat-sealing the edges.

The liner 11 is preferably formed with a stiffening element in the bottom 13, which element conforms in size and shape to the bottom of the basket. The stiffening element may be thin plywood or fiberboard and is preferably protected on both sides with the weather-proof material of which the liner is made. This may be done by inserting the stiffening element between two pieces of such material and either sewing the edges of the material together or heat-sealing them as in the case of thermoplastic material. The liner 11 has one or more tabs 15 fastened to the bottom thereof, said tabs having snap hooks 17 with mating elements 19 on the bottom of the liner. The tabs 17 are adapted to pass below a wire 21 (FIG. 4) running across the bottom of the basket and the hook on the tab fastened to the mating element on the bottom of the basket to thereby hold the bottom of the liner against the bottom of the basket and prevent it from being pulled or blown out. Although I prefer two such tabs on opposite ends of the bottom, one tab may be sufficient if placed centrally of the bottom of the liner. More than two tabs may be used when the size of the basket warrants a larger number.

The upper end 22 of liner 11 when in place in the basket should extend a short distance above the top of the basket, preferably about 1 to 2 inches. The upper end of liner 11 is provided with snap hooks 23 appropriately spaced. Mating members 25 are fastened to the liner a short distance below hooks 23. The upper end 22 is turned over the upper end of the basket as illustrated in FIGURE 2 and the hooks 23 fastened to mating elements 25, thereby fastening the upper end of the liner to the upper end of the basket. Additional snap hooks and mating elements may be located along the other walls of the upper end of the liner, if desired, to assist in holding the liner securely in place.

A cover 27 is fastened along one edge to the upper edge of the liner. Cover 27 may be formed integrally with one side wall 29 of the liner as illustrated in FIGURE 3. In this construction a fold 31 is taken in the wall 29 immediately above the top of the wire basket. Fold 31 is adapted to lap over the top horizontal wire 33 of the basket. Where the basket has brackets 5 and 7 attached to wire 33 the fold 31 is slit in line with wire 33 to form slots 35 and 37 to accommodate the ends 39 and 41 of brackets 5 and 7 where they fasten on to wire 33. Slots 35 and 37 are stitched or sewn as shown at 43 to reinforce the slots. If desired, the fold 31 may be sewn together on either or both sides of the slots 35 and 37 in order to give it more structural strength. I have found that it is sufficient to sew both the inner and outer ply of the fold around the slots 35 and 37.

In order to hold the liner more firmly to the top of the basket, I provide a snap hook 45 in the center of fold 31 with a mating member 47 near the upper end of the wall 29. After fold 31 is turned down over wire 33, hook 45 is hooked with mating member 47. Additional hooks may be provided at the top of the liner, as, for example, at the corners adjacent the attached edge of the cover in order to more firmly hold the top of the liner in place. Where baskets are mounted without brackets attached to the top thereof, the slots 35 and 37 may be eliminated.

The edge of cover 27 is preferably provided with an elastic band to secure the cover to the wire basket in closed position. The elastic band may be sewn into the entire loose edge of the cover or may be sewn into only a portion of the loose edge as for example the front and/ or corners. The elastic should, when stretched over the top of the outside of the basket, hold the cover snugly against the outside top of the basket. The cover should be of such size as to envelop the top of the basket when in closed position and extend a short distance downwardly on the outside of the basket, preferably just below the end 22 of the liner.

Although I prefer to form the cover as an integral part of at least one wall of the liner, it may be formed separately thereof and fastened thereto by sewing or, in the case of thermoplastic material, by heat-sealing.

It will be seen, therefore, that I have provided an inexpensive protective covering to protect the contents of wire bicycle baskets against injury from mud, dirt, rain and snow. When placed in a wire basket and fastened thereto, the liner will remain in place. It is easily opened and closed and by virtue of the fact that except for the edge of the cover and the upper edge of the liner, it is inside the basket, the cover is protected against scuffing. If it is desired to remove the liner for any reason as, for example, to wash it, it can be accomplished merely by unsnapping the hooks and detaching the brackets 5 and 7 by removing screws 51 and 53.

Referring to FIGURE 5, there is shown a fragmentary view of another form of basket for mounting on two sides of the rear wheel of a bicycle. In this form the two wire baskets 1 are fastened together by bars 60 which are welded to the top wires 33 so that the two baskets form a unitary structure. Welded to the cross-bars 60 are elongated bars 62 extending between the tops of the two baskets. At the end of the bar 62 is a plate 64 which is adapted to be fastened to the bicycle frame immediately below the seat by suitable clamp and screw. Brackets similar to bracket 3 shown in FIGURE 2 may also be fastened to the lower portion of the baskets in order to support the baskets on the rear wheel axle.

Where a basket as shown in FIGURE 5 is used, it will be apparent that the fold 31 will have to be slit open opposite the bars 60 in order to enable the top of the liner to be folded over the top wire 33 of the basket. In such case it is desirable to place snap hooks 45 at a plurality of points along fold 31 between and on the outside of the cross-bars 60 and to place mating elements 47 on the liner so that the liner can be effectively held on the top of the basket adjacent the elongated bar 62. Thus, instead of making the slots 35 horizontal as shown in FIGURE 2, the slots will be longitudinal and will be open-ended. The slots may be reinforced by sewing adjacent the edges thereof by heat-sealing the material adjacent the edges of the slot if the material is thermoplastic.

What is claimed is:

1. Means for protecting the contents of a bicycle wire basket against dirt and moisture comprising a collapsible weather-resistant receptacle which when fully expanded is adapted to fit snugly against the bottom and inside walls of a bicycle wire basket, the top of said receptacle having attached thereto a cover adapted to be opened to expose substantially the whole top area of the basket, means for fastening the bottom of the receptacle to the bottom of the basket and means for holding the upper end of the receptacle against the upper periphery of the basket, said means for fastening the bottom of the receptacle to the bottom of the basket being tabs extending from the outer surface of the bottom of the receptacle, said tabs being provided with snap hooks, mating hook elements on the outside bottom surface of said receptacle, said tabs being of sufficient length to lap over at least one element forming the bottom of the basket and to hook on said mating elements.

2. Means in accordance with claim 1 in which the bottom of the receptacle is formed with a flat stiffening element conforming in shape to the bottom of the basket.

3. Means in accordance with claim 1 in which said cover is integrally fastened to said receptacle and is provided with elastic adjacent its edge portion in order to hold the cover in closed position snugly over the top of the basket.

4. The combination of a bicycle wire basket and means in accordance with claim 1 for protecting the contents of said basket against dirt and moisture.

5. The combination in accordance with claim 4 in which the means for holding the upper end of the receptacle against the periphery of the basket comprises snap hooks mounted on a portion of the receptacle which extends beyond the top of said basket, mating hook elements mounted on the outside surface of said receptacle a short distance below the top of the basket, said portion lapping over the top of the basket with the hooks and mating elements in locked engagement.

6. The combination of a bicycle wire basket and means in accordance with claim 2 for protecting the contents of said basket against dirt and moisture.

7. The combination of a bicycle wire basket and means in accordance with claim 3 for protecting the contents of said basket against dirt and moisture.

8. The combination in accordance with claim 6 in which the means for holding the upper end of the receptacle against the periphery of the basket comprises snap hooks mounted on a portion of the receptacle which extends beyond the top of said basket, mating hook elements mounted on the outside surface of said receptacle a short distance below the top of the basket, said portion lapping over the top of the basket with the hooks and mating elements in locked engagement.

9. The combination in accordance with claim 7 in which the means for holding the upper end of the receptacle against the periphery of the basket comprises snap hooks mounted on a portion of the receptacle which extends beyond the top of said basket, mating hook elements mounted on the outside surface of said receptacle a short distance below the top of the basket, said portion lapping over the top of the basket with the hooks and mating elements in locked engagement.

10. Means in accordance with claim 1 including openings in the upper portion of the receptacle adapted to lap over the top of the basket, to accommodate brackets for fastening the basket to the bicycle.

References Cited

UNITED STATES PATENTS

| | | | |
|---|---|---|---|
| 475,174 | 5/1892 | Barbour | 224—32 |
| 1,102,159 | 6/1914 | Marrs | 224—32 |
| 2,007,997 | 7/1935 | Beulke et al. | 150—51 |
| 2,573,214 | 10/1951 | Moran | 150—50 X |
| 2,790,573 | 4/1957 | Warren | 220—63 X |

ROBERT G. SHERIDAN, *Primary Examiner.*

R. BALLANTYNE, *Assistant Examiner.*